(12) United States Patent
Gorny et al.

(10) Patent No.: US 11,592,783 B2
(45) Date of Patent: Feb. 28, 2023

(54) PROJECTOR DISPLAY SYSTEMS HAVING NON-MECHANICAL MIRROR BEAM STEERING

(71) Applicant: DOLBY LABORATORIES LICENSING CORPORATION, San Francisco, CA (US)

(72) Inventors: Douglas J. Gorny, Pacifica, CA (US); Martin J. Richards, Gig Harbor, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/222,637

(22) Filed: Apr. 5, 2021

(65) Prior Publication Data
US 2021/0294266 A1    Sep. 23, 2021

Related U.S. Application Data

(63) Continuation of application No. 16/710,691, filed on Dec. 11, 2019, now Pat. No. 10,969,742, which is a
(Continued)

(51) Int. Cl.
*G03H 1/08* (2006.01)
*G02B 26/02* (2006.01)
(Continued)

(52) U.S. Cl.
CPC ......... *G03H 1/0808* (2013.01); *G02B 5/3025* (2013.01); *G02B 26/02* (2013.01); *G02B 26/0833* (2013.01); *G02B 27/281* (2013.01); *G03B 21/208* (2013.01); *G03B 21/2026* (2013.01); *G03B 21/2033* (2013.01); *G03B 21/2073* (2013.01); *G03B 21/28* (2013.01);
(Continued)

(58) Field of Classification Search
None
See application file for complete search history.

(56) References Cited

U.S. PATENT DOCUMENTS

| 5,428,417 A | 6/1995 | Lichtenstein |
| 5,504,575 A * | 4/1996 | Stafford .................... G01J 3/28 |
| | | 356/330 |

(Continued)

FOREIGN PATENT DOCUMENTS

| CN | 1700085 | 11/2005 |
| CN | 101076705 | 11/2007 |

(Continued)

OTHER PUBLICATIONS

Amako, J. et al "Wave-Front Control Using Liquid-Crystal Devices" Aug. 10, 1993, vol. 32, No. 23, Applied Optics, pp. 4323-4329.
(Continued)

*Primary Examiner* — Reza Aghevli (57) ABSTRACT

Dual or multi-modulation display system are disclosed that comprise projector systems with at least one modulator that may employ non-mechanical beam steering modulation. Many embodiments disclosed herein employ a non-mechanical beam steering and/or polarizer to provide for a highlights modulator.

7 Claims, 6 Drawing Sheets

Related U.S. Application Data continuation of application No. 15/960,099, filed on Apr. 23, 2018, now Pat. No. 10,534,316, which is a continuation of application No. 14/904,946, filed as application No. PCT/US2014/048479 on Jul. 28, 2014, now Pat. No. 9,983,545.

(60) Provisional application No. 61/979,248, filed on Apr. 14, 2014, provisional application No. 61/860,203, filed on Jul. 30, 2013.

(51) Int. Cl.
*G03B 21/28* (2006.01)
*G03B 21/20* (2006.01)
*G03H 1/00* (2006.01)
*G03H 1/22* (2006.01)
*H04N 9/31* (2006.01)
*G02B 27/09* (2006.01)
*G02B 5/30* (2006.01)
*G02B 26/08* (2006.01)
*G02B 27/28* (2006.01)
*G02B 27/10* (2006.01)

(52) U.S. Cl.
CPC ......... *G03H 1/0005* (2013.01); *G03H 1/2294* (2013.01); *H04N 9/3102* (2013.01); *H04N 9/3126* (2013.01); *H04N 9/3179* (2013.01); *G02B 27/09* (2013.01); *G02B 27/10* (2013.01); *G03H 2001/0816* (2013.01)

(56) References Cited

U.S. PATENT DOCUMENTS

| | | | |
|---|---|---|---|
| 5,986,640 A | 11/1999 | Baldwin | |
| 6,088,321 A * | 7/2000 | Yamaji | G11C 13/042 369/103 |
| 6,337,760 B1 | 1/2002 | Huibers | |
| 6,373,806 B1 * | 4/2002 | Kitamura | G11C 13/042 |
| 6,535,472 B1 * | 3/2003 | Lee | G11B 7/243 |
| 6,897,999 B1 * | 5/2005 | Bass | C09K 11/7773 365/151 |
| 7,050,122 B2 | 5/2006 | Gibbon et al. | |
| 7,126,736 B2 * | 10/2006 | Itoh | H04N 9/3117 359/211.2 |
| 7,346,234 B2 | 3/2008 | Davis | |
| 7,551,341 B1 * | 6/2009 | Ward | G03B 21/005 359/259 |
| 7,812,959 B1 * | 10/2010 | Kim | G03H 1/0408 356/458 |
| 7,986,603 B1 * | 7/2011 | Trisnadi | G11B 7/083 369/103 |
| 8,199,387 B1 | 6/2012 | Aye | |
| 8,366,275 B2 * | 2/2013 | Harding | H04N 9/3155 345/694 |
| 8,783,874 B1 * | 7/2014 | Riza | G02B 26/105 348/343 |
| 9,049,413 B2 | 6/2015 | Richards | |
| 9,531,982 B2 | 12/2016 | Richards | |
| 9,983,545 B2 * | 5/2018 | Gorny | G02B 27/281 |
| 10,534,316 B2 * | 1/2020 | Gorny | G03B 21/28 |
| 10,969,742 B2 * | 4/2021 | Gorny | G03B 21/208 |
| 2001/0017836 A1 * | 8/2001 | Itoh | G11B 7/0025 |
| 2003/0016335 A1 | 1/2003 | Penn | |
| 2004/0001184 A1 | 1/2004 | Gibbons | |
| 2005/0169094 A1 * | 8/2005 | Itoh | G03H 1/265 |
| 2005/0190140 A1 | 9/2005 | Asahi et al. | |
| 2005/0259308 A1 * | 11/2005 | Itoh | H04N 9/3117 359/211.2 |
| 2005/0286101 A1 | 12/2005 | Garner | |
| 2006/0092380 A1 | 5/2006 | Salsman | |
| 2006/0164705 A1 * | 7/2006 | Itoh | G11B 7/0065 |
| 2007/0058143 A1 * | 3/2007 | Penn | G03B 21/2033 348/E9.027 |
| 2007/0120786 A1 | 5/2007 | Bells, II | |
| 2007/0146846 A1 * | 6/2007 | Yasuda | G11B 7/0065 |
| 2007/0268224 A1 * | 11/2007 | Whitehead | H04N 9/3102 348/E9.027 |
| 2007/0285587 A1 * | 12/2007 | Seetzen | G09G 3/3426 348/844 |
| 2008/0024848 A1 * | 1/2008 | Kawano | G02B 5/32 359/21 |
| 2008/0043303 A1 * | 2/2008 | Whitehead | G03B 21/26 359/240 |
| 2008/0174860 A1 * | 7/2008 | Yelleswarapu | G02B 21/14 359/370 |
| 2008/0180465 A1 * | 7/2008 | Whitehead | G09G 3/3426 345/694 |
| 2008/0185978 A1 | 8/2008 | Jeong | |
| 2008/0186308 A1 * | 8/2008 | Suzuki | H04N 13/32 345/419 |
| 2008/0204834 A1 * | 8/2008 | Hill | G06Q 30/0601 359/9 |
| 2008/0231936 A1 * | 9/2008 | Endo | G09G 3/346 348/E5.142 |
| 2008/0239419 A1 * | 10/2008 | Tachibana | G11B 7/0065 |
| 2008/0246705 A1 | 10/2008 | Russell | |
| 2008/0246783 A1 * | 10/2008 | Endo | H04N 5/7458 348/E5.142 |
| 2009/0103151 A1 * | 4/2009 | Horikawa | G02B 26/0825 359/9 |
| 2009/0135314 A1 | 5/2009 | Hui | |
| 2009/0141189 A1 * | 6/2009 | Shirai | G02B 26/0833 348/743 |
| 2009/0141194 A1 * | 6/2009 | Shirai | G03B 33/14 348/756 |
| 2009/0225234 A1 * | 9/2009 | Ward | G03B 21/26 348/744 |
| 2009/0244499 A1 * | 10/2009 | Bartlett | G02B 6/00 359/290 |
| 2009/0278918 A1 * | 11/2009 | Marcus | G02B 30/25 359/464 |
| 2009/0284671 A1 * | 11/2009 | Leister | G03H 1/02 349/37 |
| 2010/0014134 A1 | 1/2010 | Cable | |
| 2010/0039918 A1 * | 2/2010 | Tanaka | G03H 1/22 |
| 2010/0046050 A1 | 2/2010 | Kroll | |
| 2010/0103246 A1 | 4/2010 | Schwerdtner | |
| 2010/0118360 A1 * | 5/2010 | Leister | G03H 1/0808 359/9 |
| 2010/0149139 A1 * | 6/2010 | Kroll | G03H 1/02 345/204 |
| 2010/0149311 A1 * | 6/2010 | Kroll | G03H 1/0808 348/E13.001 |
| 2010/0157399 A1 * | 6/2010 | Kroll | G03H 1/02 359/11 |
| 2010/0165429 A1 | 7/2010 | Buckley | |
| 2010/0214282 A1 * | 8/2010 | Whitehead | G09G 3/3433 345/214 |
| 2010/0253677 A1 * | 10/2010 | Kroll | G03H 1/2294 345/205 |
| 2011/0227900 A1 | 9/2011 | Wallener | |
| 2011/0251905 A1 * | 10/2011 | Lawrence | G06F 3/042 705/15 |
| 2011/0273495 A1 * | 11/2011 | Ward | G09G 3/3426 345/694 |
| 2011/0279749 A1 | 11/2011 | Erinjippurath | |
| 2011/0292350 A1 * | 12/2011 | Kasazumi | G02B 27/0933 353/31 |
| 2012/0008181 A1 | 1/2012 | Cable | |
| 2012/0092624 A1 | 4/2012 | Oiwa | |
| 2012/0105929 A1 * | 5/2012 | Sung | G02B 5/32 359/9 |
| 2012/0133689 A1 | 5/2012 | Kwong | |
| 2012/0140446 A1 * | 6/2012 | Seetzen | G02B 6/0005 362/97.1 |
| 2012/0188467 A1 | 7/2012 | Escuti | |
| 2012/0188620 A1 | 7/2012 | De Echaniz | |
| 2012/0219021 A1 | 8/2012 | Lippey | |

(56) References Cited

U.S. PATENT DOCUMENTS

| | | | | |
|---|---|---|---|---|
| 2013/0050409 A1* | 2/2013 | Li | G03H 1/2294 | |
| | | | 977/932 | |
| 2013/0070207 A1* | 3/2013 | Korenaga | G02B 27/48 | |
| | | | 359/569 | |
| 2013/0100333 A1* | 4/2013 | Awatsuji | H04N 5/2256 | |
| | | | 348/335 | |
| 2013/0106923 A1 | 5/2013 | Shields et al. | | |
| 2013/0148037 A1 | 6/2013 | Whitehead | | |
| 2013/0215730 A1* | 8/2013 | Okamoto | G11B 7/1395 | |
| | | | 369/103 | |
| 2013/0265554 A1 | 10/2013 | Baranec | | |
| 2014/0043352 A1* | 2/2014 | Damberg | G03H 1/2249 | |
| | | | 345/589 | |
| 2014/0340286 A1* | 11/2014 | Machida | G02B 27/017 | |
| | | | 345/8 | |
| 2015/0002750 A1* | 1/2015 | Toyooka | H04N 9/3194 | |
| | | | 348/779 | |
| 2015/0346491 A1* | 12/2015 | Christmas | G03H 1/0808 | |
| | | | 359/9 | |
| 2016/0077339 A1* | 3/2016 | Christmas | G03H 1/2294 | |
| | | | 359/11 | |
| 2016/0381329 A1* | 12/2016 | Damberg | G03H 1/0005 | |
| | | | 348/40 | |

FOREIGN PATENT DOCUMENTS

| | | | | |
|---|---|---|---|---|
| CN | 101076705 A * | 11/2007 | | G01B 11/0625 |
| CN | 101822043 | 9/2010 | | |
| CN | 101822043 A * | 9/2010 | | H04N 9/3126 |
| CN | 102749793 | 10/2012 | | |
| CN | 103080831 | 5/2013 | | |
| CN | 103080831 A * | 5/2013 | | G02B 27/48 |
| GB | 2485609 | 5/2012 | | |
| JP | H08-294138 A | 11/1996 | | |
| JP | 2005241905 | 9/2005 | | |
| JP | 2006208923 | 8/2006 | | |
| JP | 2008544307 A | 12/2008 | | |
| JP | 2009539138 | 11/2009 | | |
| JP | 2010145431 A | 7/2010 | | |
| JP | 2011514546 | 5/2011 | | |
| JP | 2011528132 | 11/2011 | | |
| WO | 2005071654 | 8/2005 | | |
| WO | 2010125367 | 11/2010 | | |
| WO | 2012145200 | 10/2012 | | |
| WO | 2013094011 A1 | 6/2013 | | |
| WO | WO-2017054342 A1 * | 4/2017 | | G03B 21/00 |

OTHER PUBLICATIONS

I.V. II "Iina et al" Gerchberg-Saxton Algorithm: Experimental Realisation and Modification for the Problem of Formation of Multimode Laser Beams, "Quantum Electronics",39,No. 6, 209, pp. 521-527.

* cited by examiner

PROJECTOR DISPLAY SYSTEMS HAVING NON-MECHANICAL MIRROR BEAM STEERING

CROSS REFERENCE TO RELATED APPLICATIONS

This application is a continuation of U.S. Non-Provisional application Ser. No. 16/710,691, filed 11 Dec. 2019 which is a continuation of U.S. Non-Provisional application Ser. No. 15/960,099, filed 23 Apr. 2018, now U.S. Pat. No. 10,534,316, which is a continuation of U.S. Non-Provisional application Ser. No. 14/904,946, filed 13 Jan. 2016, now U.S. Pat. No. 9,983,545, which is a 371 U.S. National phase of PCT/US2014/048479, filed 28 Jul. 2014, which claims priority to U.S. Provisional Patent Application No. 61/860,203, filed on 30 Jul. 2013 and U.S. Provisional Patent Application No. 61/979,248, filed on 14 Apr. 2014, each of which is hereby incorporated by reference in its entirety.

TECHNICAL FIELD

The present invention relates to displays systems and, more particularly, to dual or multi-stage modulation projection display systems possibly employing highlight modulation.

BACKGROUND

In a conventional multi-stage modulation projector system, there is typically a single light source that illuminates a screen with an image that is modulated by some optical system within the projector. In such conventional multi-stage modulation projector systems, it is typical that the highlights modulator is a MEMS array—or some other means of mechanical beam steering. Highlight modulators have the ability to steer the light reaching their individual steering elements to any arbitrary location in the following light path. Merely for one example, a highlights modulator may be able to steer more light onto a portion of a projected image that has a higher luminance that surrounding parts of the image—thus, that portion would be "highlighted".

In the context of these dual/multi-modulator projector systems, it may be possible to construct such a projector system with at least one highlights modulator that may possibly employ non-mechanical beam steering that does not necessary rely on moveable mirror(s).

SUMMARY

Several embodiments of display systems and methods of their manufacture and use are herein disclosed.

In one embodiment, a projector display system, said display system comprising: a light source; a controller; a first holographic modulator, said first modulator being illuminated by said light source and said first modulator comprising a holographic imaging module; a lens, said lens adapted to transmit from said first holographic modulator; a second modulator, said second modulator being illuminated by light from said lens and capable of modulating light from said lens, and said second modulator comprising a plurality of mirrors; said controller further comprising: a processor; a memory, said memory associated with said processor and said memory further comprising processor-readable instructions, such that when said processor reads the processor-readable instructions, causes the processor to perform the following instructions: receiving image data; sending control signals to said first holographic modulator such that said first holographic modulator may allocate a desired proportion of the light from said light source onto said second modulator; and sending control signals to said second modulator such that said desired proportion of the light from said light source is modulated to form said desired image for projection.

In another embodiment, projector display system, said display system comprising: a light source; a controller; a polarizer, said polarizer being illuminated by said light source and said polarizer inducing a desired polarization to the light from said light source; a beam expander, said beam expander expanding said light from said polarizer; a first partial beam splitter, said first partial beam splitter capable of splitting the light preferentially along a main light path and a highlight path; a spatial light modulator, said spatial light modulator receiving said light along said highlight path and modulating said light along said highlight path to create a desired highlight light; a second partial beam splitter, said second partial beam splitter capable of combining light from said main light path and said highlight path; said controller further comprising: a processor; a memory, said memory associated with said processor and said memory further comprising processor-readable instructions, such that when said processor reads the processor-readable instructions, causes the processor to perform the following instructions: receiving image data, said image data potentially comprising at least one highlight feature; sending control signals to said spatial light modulator, such that said spatial light modulator may send a desired amount of highlight light to be combined with light from the main light path at said second partial beam splitter to form said highlight feature.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

Figure 1:
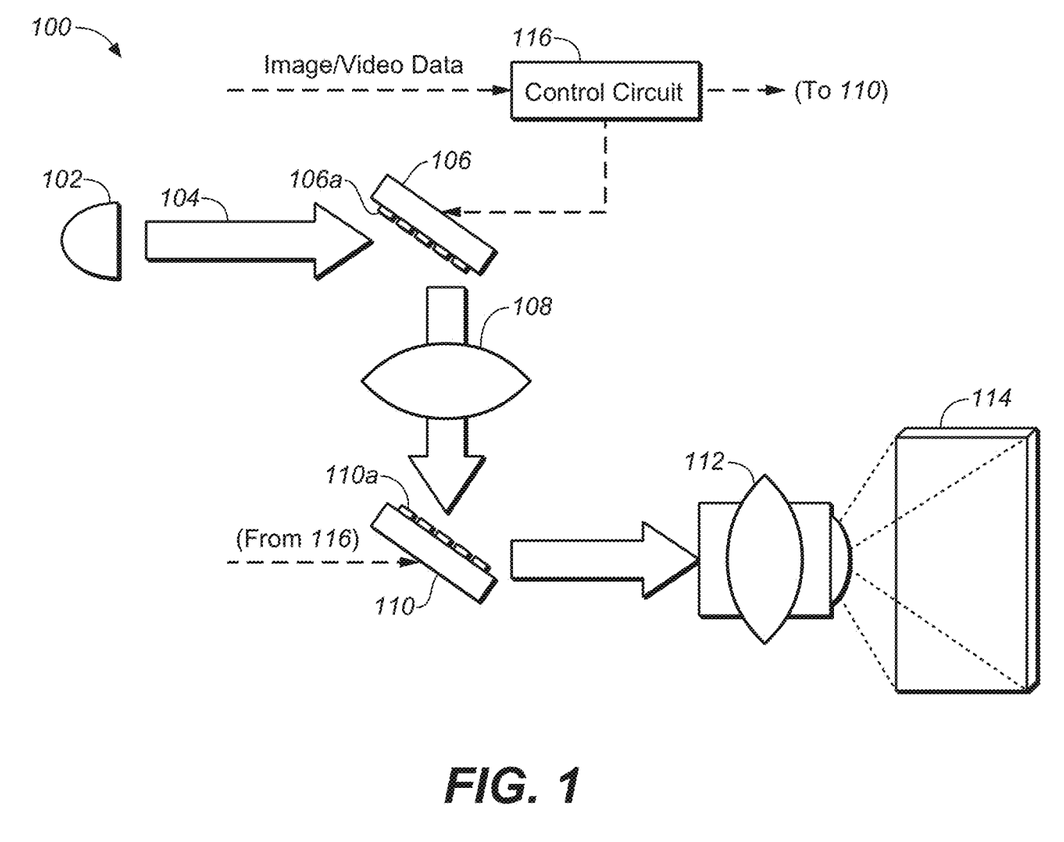
FIG. 1 is one embodiment of a dual/multi-modulator projector display system that employs two moveable mirror assemblies that may take advantage of a highlights modulator.

Current dual/multi-modulator projector display systems comprise two or more modulation stages where illuminating light is passed in order to form a final projected image upon a projection screen. For the most part, such modulation stages comprise mechanical beam steering architectures— e.g., DMD, MEMS or some mechanically actuated set of mirrors. FIG. 1 depicts an embodiment of a dual/multi-modulator projector display system that employs mechanical beam steering modulators.

Projector system 100 employs a light source 102 that supplies the projector system with a desired illumination such that a final projected image will be sufficiently bright for the intended viewers of the projected image. Light source 102 may comprise any suitable light source possible— including, but not limited to: Xenon lamp, laser(s), LEDs, coherent light source, partially coherent light sources.

Light 104 may illuminate a first modulator 106 that may, in turn, illuminate a second modulator 110, via a set of optional optical components 108. Light from second modulator 110 may be projected by a projection lens 112 (or other suitable optical components) to form a final projected image upon a screen 114. First and second modulators may be controlled by a controller 116—which may receive input image and/or video data. Controller 116 may perform certain image processing algorithms, gamut mapping algorithms or other such suitable processing upon the input image/video data and output control/data signals to first and second modulators in order to achieve a desired final projected image 114. In addition, in some projector systems, it may be possible, depending on the light source, to modulate light source 102 (control line not shown) in order to achieve additional control of the image quality of the final projected image.

First modulator 106 and second modulator 110 may comprise a set of mechanically moveable mirrors 106a and 110a, respectively—e.g., as may form a DMD or MEMS array. These mirrors may be moved or otherwise actuated according to control signals received from the controller 116. Light may be steered by the first and second modulators as desired by such mechanical actuation.

Dual modulation projector and display systems have been described in commonly-owned patents and patent applications, including:
(1) U.S. Pat. No. 8,125,702 to Ward et al., issued on Feb. 28, 2012 and entitled "SERIAL MODULATION DISPLAY HAVING BINARY LIGHT MODULATION STAGE";
(2) United States Patent Application 20130148037 to Whitehead et al., published on Jun. 13, 2013 and entitled "PROJECTION DISPLAYS";
(3) United States Patent Application 20110227900 to Wallener, published on Sep. 22, 2011 and entitled "CUSTOM PSFs USING CLUSTERED LIGHT SOURCES";
(4) United States Patent Application 20130106923 to Shields et al., published on May 2, 2013 and entitled "SYSTEMS AND METHODS FOR ACCURATELY REPRESENTING HIGH CONTRAST IMAGERY ON HIGH DYNAMIC RANGE DISPLAY SYSTEMS";
(5) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION" and
(6) United States Patent Application 20120133689 to Kwong, published on May 31, 2012 and entitled "REFLECTORS WITH SPATIALLY VARYING REFLECTANCE/ABSORPTION GRADIENTS FOR COLOR AND LUMINANCE COMPENSATION".
all of which are hereby incorporated by reference in their entirety.

In addition, there are references that disclose the use of holographic projection and the Fourier nature of the illumination to create projector display system such as:
(1) United States Patent Application 20140043352 to Damberg et al., published on Feb. 13, 2014 and entitled "HIGH LUMINANCE PROJECTION DISPLAYS AND ASSOCIATED METHODS";
(2) United States Patent Application 20100157399 to Kroll et al., published on Jun. 24, 2010 and entitled "HOLOGRAPHIC DISPLAY";
(3) United States Patent Application 20100046050 to Kroll et al., published on Feb. 25, 2010 and entitled "COMPACT HOLOGRAPHIC DISPLAY DEVICE";
(4) United States Patent Application 20120008181 Cable et al., published on Jan. 12, 2012 and entitled "HOLOGRAPHIC IMAGE DISPLAY SYSTEMS";
(5) United States Patent Application 20120188620 to De Echaniz et al., published on Jul. 26, 2012 and entitled "LASER IMAGE PROJECTION SYSTEM APPLICABLE TO THE MARKING OF OBJECTS AND METHOD FOR GENERATING HOLOGRAMS"
all of which are hereby incorporated by reference in their entirety.

Non-Mechanical Beam Steering Embodiments

Non-mechanical beam steering modulators, as opposed to mechanical modulators, may not have need of MEMS devices but instead leverage more common imaging devices such as LCD modulators. In particular, it may be desirable to have at least one or more modulator stages that do not comprise a moveable arrangement of mirrors.

Figure 2:
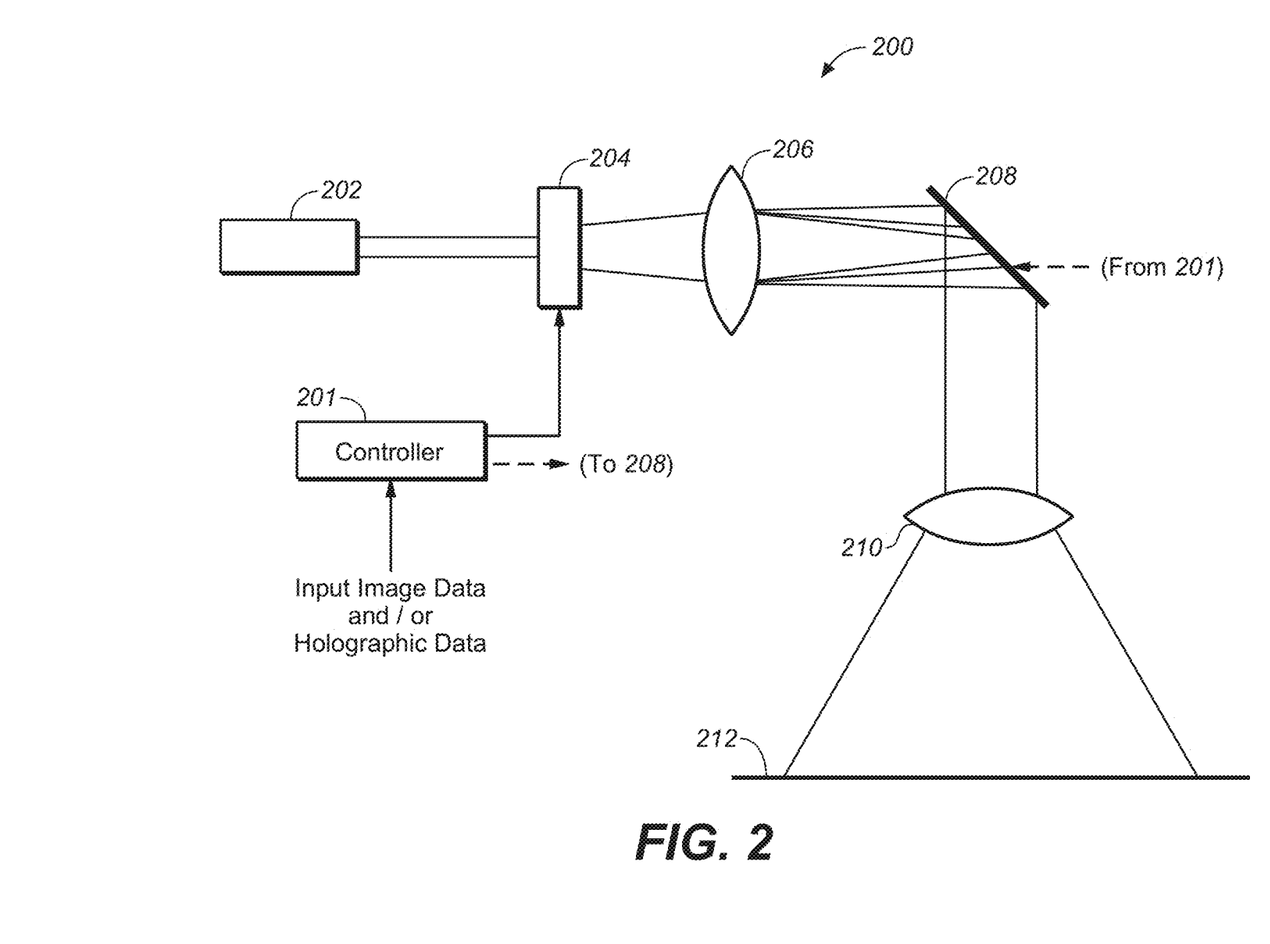
FIG. 2 is one embodiment of a dual/multi-modulator projector display system that employs a holographic imaging module as at least one non-mechanical means for steering beams of light, as made in accordance with the principles of the present application.

FIG. 2 depicts one embodiment of a suitable projector system (200) comprising at least one non-mechanical beam steering module. Projector system 200 comprises a light source 202 that may comprise laser(s), LEDs, coherent or partially coherent light source(s)—e.g., where the light may be of the same wavelength and phase. It suffices that, whatever light is produced from source 202, that light is able to sufficiently interact with a holographic image to affect the beam of the light.

Light from source 202 illuminates first holographic modulator 204. First modulator 204 may comprise an LCD panel or any other module that is capable of forming a holographic image thereon and interacting with the light from source 202. First modulator 204 may receive its holographic image from controller 201—which, in turn, may either derive holographic data and/or control signals from input image data—or may receive holographic data from the input data stream that may accompany the input image data, if needed. As will be discussed further herein, holographic data may be derived through an iterative process that may reside inside the controller or may be sent to the controller from an outside process.

The light passing through the first modulator 204 may illuminate a lens (and/or optical subsystem) 206. Lens 206 may affect a Fourier transformation of the illumination such that desired beam steering may be affected onto a second modulator 208. The light from lens 206 may be beam steered in a desired spatio-temporal fashion that allows the projector system to perform a highlight illumination of any desired feature within the projected image. For example, if there is a desired specular reflection (or any other suitable feature with higher luminance that other features) within an finally projected image, then non-mechanical beam steering employing holographic image processing is capable of steering the beam in a timely fashion to provide additional illumination to the highlight features in the finally projected image.

Second modulator 208 may be any known modulator—e.g., DMD, MEMS and/or any set of moveable mirrors, such that the light modulated by modulator 208 (according to control signals from controller 201) may be processed by projection lens 210 and finally projected onto screen 212 for viewing.

One Holographic Data Processing Embodiment

Figure 3:
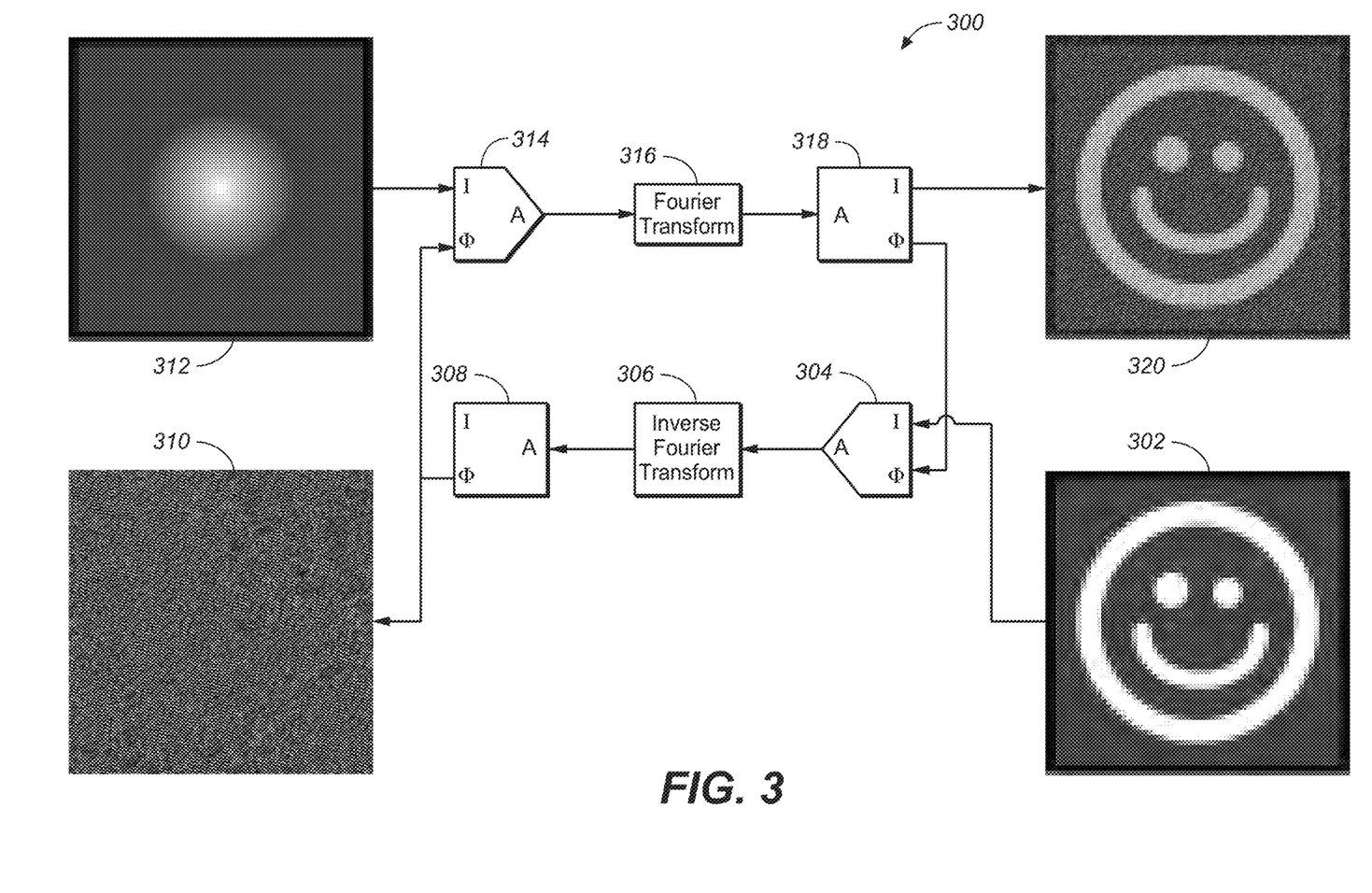
FIG. 3 is one embodiment of a system and/or method for creating holograms for holographic imaging that affects the desired beam steering in the display system of FIG. 2.

As mentioned above, the holographic data may be derived from input image data in on-board or off-line process. FIG. 3 depicts one embodiment of an iterative processing system 300 (called the Gerchberg-Saxton algorithm, a description of which may be found at http://en.wikipedia.org/wiki/Gerchberg%E2%80%93Saxton_algorithm) by which holographic data may be derived from input image data.

Suppose input image 302 is the desired image to be modeled and/or rendered by a display system. The holographic processing system 300 would input image data 302 into a circuit and would be placed through an inverse Fourier Transform process 306 in order to create a holographic representation 310 of the input image 302.

As may be seen, holographic image 310 may appear to a human viewer as a jumbled and perhaps disordered image, it in fact captures the information content of the input image—but in the frequency domain. This frequency information (e.g., Fourier coefficients) may be input into a processing block 314—together with amplitude model of the light from source 202 (312). The output of processing block 314 may be taken into a Fourier Transform process 316 producing the resulting 320 which is an approximation of 302. The difference between is 302 and 320 is calculated in processing block 304 and used to refine the image sent to 306 to reiterate the process until the error between 320 and 302 is within tolerance. Once this is achieved 310 can be used as the holographic data applied to 204.

As mentioned, this process may be performed in real-time at the controller 201 based on input image data—or it may be supplied to the controller via some off-line process.

Figure 4:
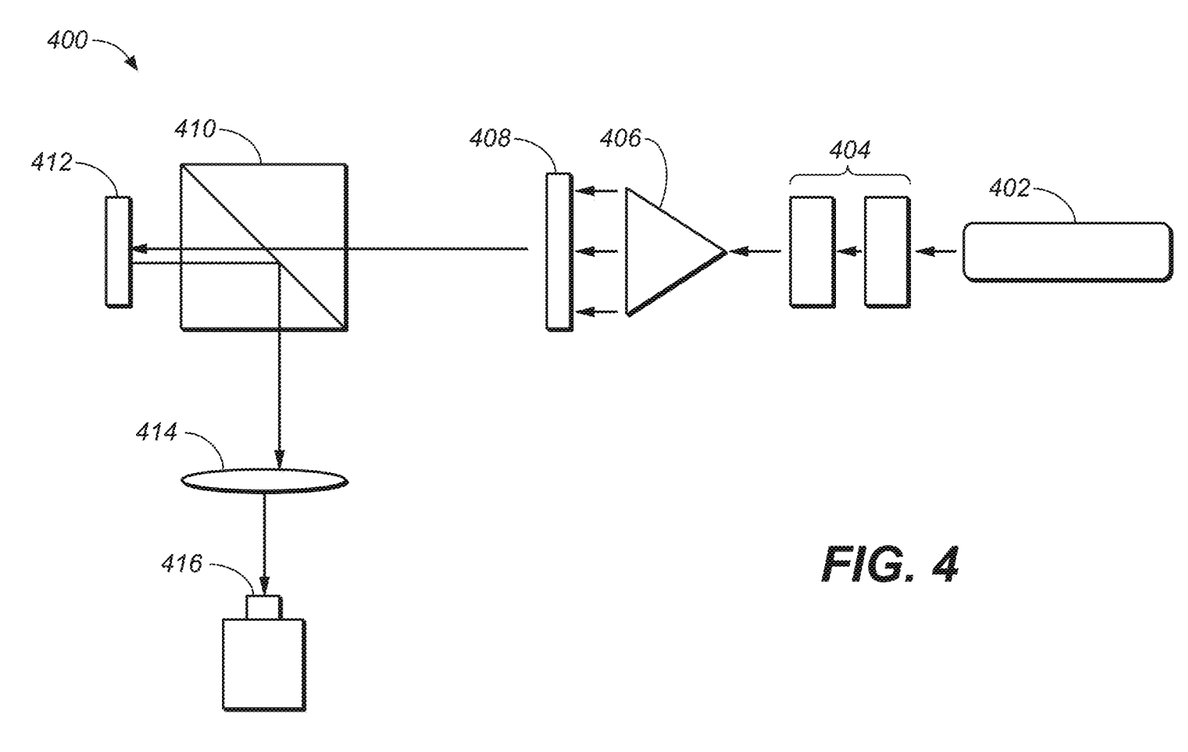
FIG. 4 is another embodiment of a system for creating the holographic imaging that affects the desired beam steering in the display system of FIG. 2.

FIG. 4 is one embodiment of a hologram image generator 400, as made in accordance with the principles of the present application. Generator 400 may comprise a laser light source 402 (or some suitable coherent or partially coherent light source). The light may transmit through one or more optional polarizers 404 to adjust the intensity of the light from source 402. It should be noted that this may not be a requirement of a generic system; but may provide a sort of global dimming feature. The light may be spread out accordingly with optical element 406. This light may then pass through a half-wave plate 408 to polarize the light as desired to be used by the polarizing beam splitter 410. Splitter 410 allows the polarized light from 408 to reach Spatial Light Modulator (SLM) 412 and then redirects the light reflected off 412 to 414. SLM 412 phase shifts the light from 408 according to the holographic data applied to it. Lens 414 performs an inverse Fourier transform on the phase shifted light producing the desired image at image capture 416. Image capture 416 is shown as a camera but may also be a subsequent modulator in a multi-modulation system.

Rotatable Polarization Plate Embodiment for Beam Steering

Apart from holographic means of beam steering, there are other non-mechanical beam steering modules that may be suitable in a dual/multi-modulation projection display system.

There are described in the following reference the use of a rotatable polarizer as a means to affect beam steering:
(1) United States Patent Application 20130265554 to BARANEC et al., published on Oct. 10, 2013 and entitled "COMPACT LASER PROJECTION SYSTEMS AND METHODS"; and
(2) United States Patent Application 20120188467 to Escuti et al., published on Jul. 26, 2012 and entitled "BEAM STEERING DEVICES INCLUDING STACKED LIQUID CRYSTAL POLARIZATION GRATINGS AND RELATED METHODS OF OPERATION"
all of which are hereby incorporated by reference in their entirety.

Figure 5A:
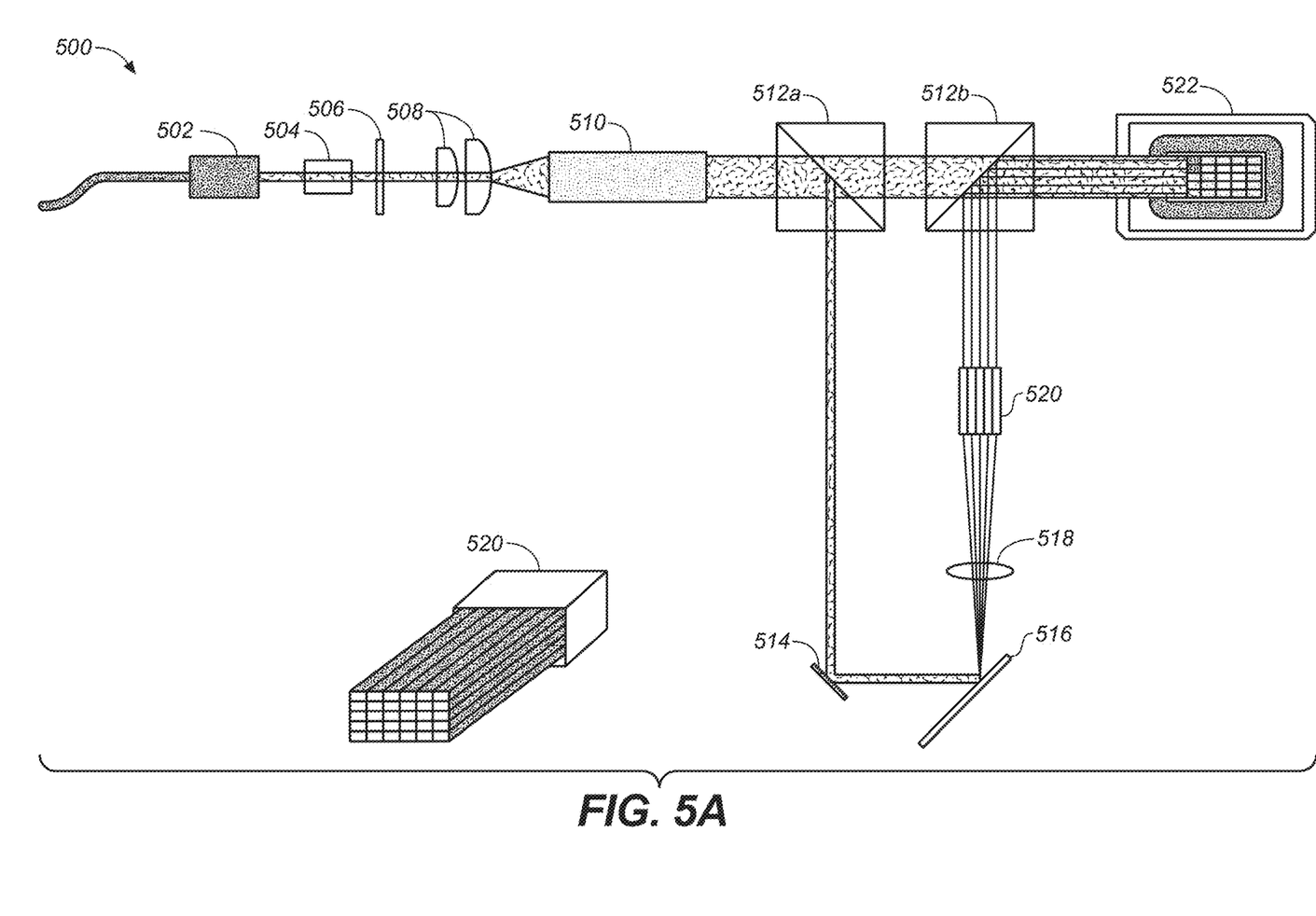
FIG. 5A is one embodiment of a dual/multi-modulator projector display system that may employ a polarizer to adjust the balance of light between a main light path and a highlight light path, as made in accordance with the principles of the present application.

FIG. 5A depicts one such embodiment that may employ a polarization plate (e.g., either fixed or rotatable) that affects desired beam steering as discussed herein. In one embodiment, projection display system 500 may comprise a laser (or some coherent/partially coherent) light source 502, polarization recovery optics (PRO) 504, rotatable polarizer 506, beam forming/expanding lenses 508, integrating rod (or alternatively, a beam expander) 510, partial beam splitter 512a, mirror 514, MEMS array 516, lens 518, stack rod array 520, partial beam splitter 512b, and DMD array 522.

Array 522 may serve as a second and/or additional modulator to provide additional light processing for finally projection of a final image (and possibly, through additional optical elements and/or components). The components from 502 to 512a may provide a light path directly to 512b—e.g., as a main beam providing substantially all of the desired illumination for the finally projected image. However, depending on polarization of the light from integrating rod(s) 510, a second light path (e.g., down to element 514) may be employed, e.g., for a highlight illumination path that eventually may be recombined with the main beam at 512b—e.g., to provide a desired amount and placement of highlight illumination.

FIG. 5A depicts using polarization to control the amount of uniform light directly reaching the next stage of modulation and the amount of light reaching the highlights modulator which is then sorted into discrete bins (e.g., as seen as the segments comprising 520) and that resulting non-uniform light field may be applied to the next stage of modulation. As may also be seen, MEMS device 516 may be used to sort the light reaching it into discrete segments in 520. In another embodiment, it may be possible to replace 516, 518, and 520 with elements 410, 412 and 414—e.g., in the case of non-mechanical beam steering.

In operation, laser light from 502 illuminates the optical subsystem 504 and 506. The light illuminates rotatable polarizer 506—which may be made to rotate under control signals from a controller (not shown). 506 polarizes the light from 502 and adjusts the polarization orientation relative to polarizing beam splitter 512a. 504 is an optional polarization recycling subsystem which may be used to improve the efficiency of the polarization. 510 is used to make the light more uniform such that it can be used with modulators 516 and 522. 512a will divert a portion of the light reaching it from 510 to 514 and the remainder to 512b. The amount of each proportion will be dependent on the polarization orientation set by 506. 514 is an optional fold mirror used to redirect the light from 512a to 516. 516 is a MEMS device with independently controllable mirrors which can divert the light reaching them to anyone of the segments of integrating rod 520. More light is diverted to segments which correspond to brighter areas of the image to be reproduced. 518 is a lens used to image the light reflected off the mirrors on 516 into the segmented integrating rod 520. 512b is used to combine the uniform light field from 512a with the typically non-uniform light field from 520 onto the next modulator 522. 522 modulates the combined light field from 512b to create the desired image. Typically there is a projection lens system and screen following 522, similar to 112 and 114 in FIG. 1A, which are used to realize the desired image.

The controller (not shown) analyzes the desired image to be produced and provide control to the 506, 516 and 522 to generate that image. 506 can be used to divert the amount of light required to establish the uniform illumination necessary at 522 to produce the image. The remaining light is routed to 516. Control to 516 determines how much light is directed to each segment of 520. The brighter parts of the image will have more light directed to their corresponding segments. The combined light field from 512b is compensated with the control sent to modulator 522 in order to create the desired image. In the case were the source 502 has more light then required either 502 can be reduced in intensity or 516 can be used to divert unused light outside of 520 so it doesn't reach 522.

In another embodiment, polarizer 506 may be a fixed element and the amount of light split to the highlight path may be substantially a fixed percentage of the total light—e.g., 90% to main light path and 10% to highlight light path. The amount of highlight light to be recombined with the main light may be controlled by allowing a desired amount of highlight light to go to a light dump—or to the highlight path and recombined with the main light path.

Figure 5B:
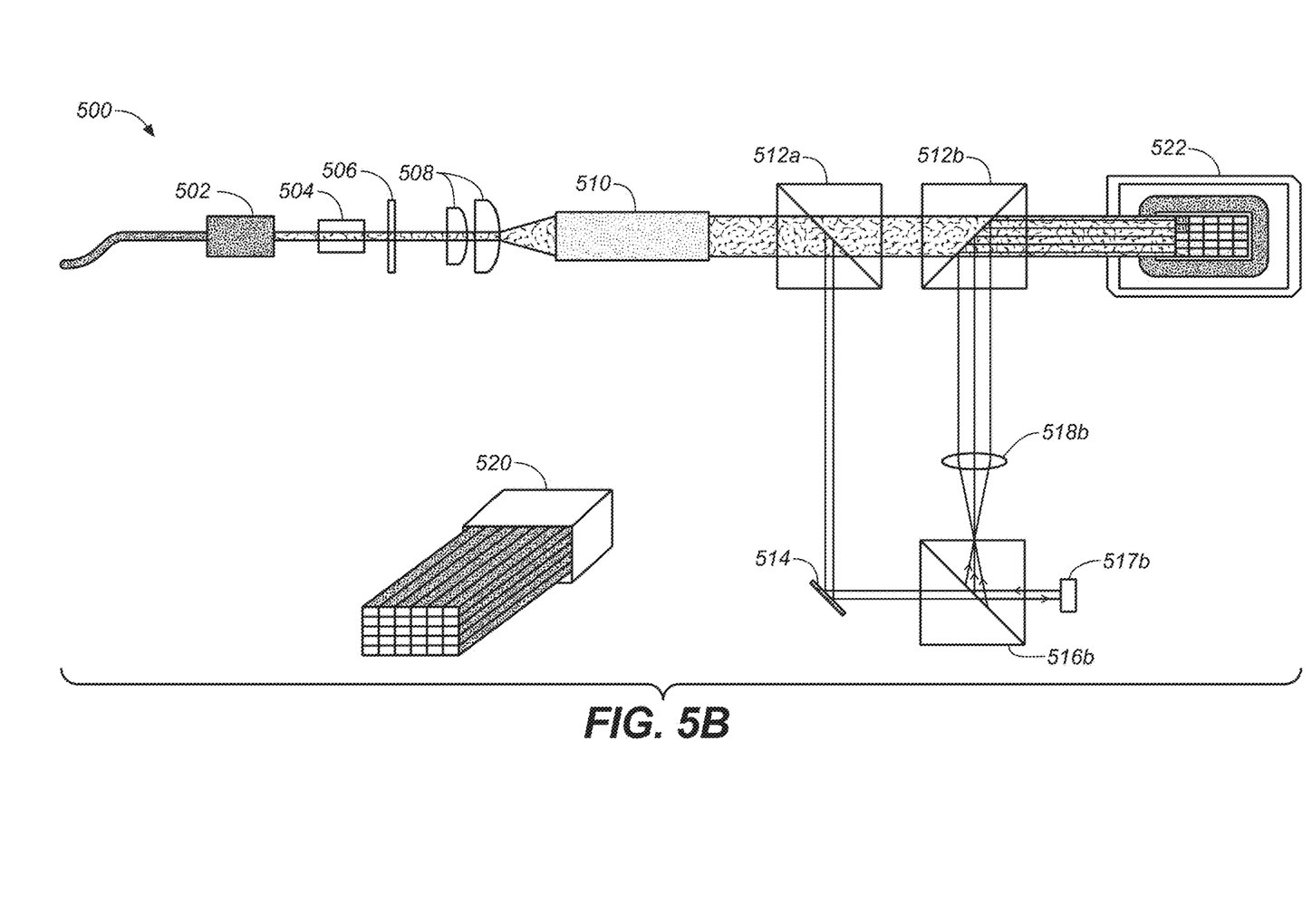
FIG. 5B is yet another embodiment of a dual/multi-modulator projector system that may employ a polarizer to adjust the balance of light between a main light path and a highlight light path using a non-mechanical beam steering modulator, as made in accordance with the principles of the present application

FIG. 5B depicts yet another embodiment of a projector display system that may employ a non-mechanical beam steering module in the highlight light path. In this embodiment, light from element 514 may be passed through a beam splitter 516b to a SLM 517b. This light may be holographically modulated as discussed above in reference to FIGS. 2, 3 and 4 above. Lens 518b may provide a suitable Fourier transformation as previously discussed and the resulting light may provide the highlight as desired—and combined onto the main light path at beam splitter 512b.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method of display projection, comprising:
polarizing a light emitted from a light source by a polarizer, wherein the polarizer adjusts a polarization orientation of the light relative to a first beam splitter;
splitting the light, by the first beam splitter, along a main light path and a highlight path;
modulating the light along the highlight path, by a spatial light modulator, to generate a highlight light;
sending, by the spatial light modulator, at least a portion of the highlight light to a second beam splitter along the highlight path; and
combining, by the second beam splitter, the portion of the highlight light from the highlight path and the light from the main light path to form a projection image including at least one highlight feature.

2. The method of claim 1, further comprising:
receiving, by a controller, image data of the projection image including image data of the at least one highlight feature; and
sending control signals to the spatial light modulator, by the controller, for sending the portion of the highlight light to be combined with the light from the main light path at the second beam splitter to form the projection image including the at least one highlight feature.

3. The method of claim 2, wherein the polarizer is a rotatable polarizer, the method further comprising:
sending control signals to the rotatable polarizer, by the controller, for controlling an amount of the light to be split to the highlight path from the main light path.

4. The method of claim 2, wherein the polarizer is a fixed polarizer, the method further comprising:
sending control signals to the spatial light modulator, by the controller, for controlling an amount of the light to be dumped from the highlight path.

5. The method of claim 1, further comprising:
   expanding the light from the polarizer by a beam expander.

6. The method of claim 1, wherein the spatial light modulator includes a MEMS (Micro-Electro-Mechanical System) array and an integrating rod.

7. The method of claim 1, wherein the spatial light modulator is a holographic spatial light modulator including a partial beam splitter and a lens.

* * * * *